US009092460B2

(12) United States Patent
Somogyi et al.

(10) Patent No.: US 9,092,460 B2
(45) Date of Patent: Jul. 28, 2015

(54) SYSTEM AND METHOD FOR USING A GRIDLINK DATA SOURCE TO CONNECT AN APPLICATION SERVER WITH A CLUSTERED DATABASE

(75) Inventors: Alex Somogyi, Basking Ridge, NJ (US); Naresh Revanuru, Fremont, CA (US); Rajkumar Irudayaraj, Mountain View, CA (US); Stephen Felts, Denville, NJ (US); Tong Zhou, Merrick, NY (US); Frances Zhao-Perez, Portland, OR (US)

(73) Assignee: ORACLE INTERNATIONAL CORPORATION, Redwood Shores ( * ) Notice: Subject to any disclaimer, the term of this patent is extended or adjusted under 35 U.S.C. 154(b) by 528 days.

(21) Appl. No.: 13/168,506

(22) Filed: Jun. 24, 2011

(65) Prior Publication Data
US 2012/0066363 A1 Mar. 15, 2012

Related U.S. Application Data

(60) Provisional application No. 61/383,285, filed on Sep. 15, 2010, provisional application No. 61/384,227, filed on Sep. 17, 2010.

(51) Int. Cl.
*G06F 15/173* (2006.01)
*G06F 17/30* (2006.01)
(Continued)

(52) U.S. Cl.
CPC .... *G06F 17/30286* (2013.01); *G06F 17/30368* (2013.01); *G06F 17/30584* (2013.01); *H04L 41/042* (2013.01); *H04L 41/0686* (2013.01); *H04L 67/10* (2013.01); *H04L 67/1002* (2013.01); *H04L 67/1034* (2013.01)

(58) Field of Classification Search
CPC .............. H04L 67/1002; H04L 41/042; H04L 41/0686; H04L 67/10; H04L 67/1034
USPC ......................................................... 709/223
See application file for complete search history.

(56) References Cited

U.S. PATENT DOCUMENTS

| 5,109,384 A * | 4/1992 | Tseung ........................ 714/748 |
| 6,424,992 B2 | 7/2002 | Devarakonda et al. |
| 6,895,590 B2 | 5/2005 | Yadav |

(Continued)

OTHER PUBLICATIONS

Richard G. Baldwin, "The ByteBuffer Class in Java : Java Programming Notes #1782"., Aug. 20, 2002. 14 pages. Retrieved from: http://www.developer.com/java/other/article.php/1449271/The-ByteBuffer-Class-in-Java.htm.

(Continued)

*Primary Examiner* — Richard G Keehn
(74) *Attorney, Agent, or Firm* — Tucker Ellis LLP

(57) ABSTRACT

A system and method can support using a data source to connect an application server with a clustered database. The clustered database includes a plurality of database instances and is associated with a notification service. The notification service can be used by the clustered database to broadcast notifications that describe a state change in the plurality of database instances. The data source includes a connection pool, which manages a set of connections to the plurality of database instances in the clustered database. The data source operates to register with the notification service to receive notifications on the change of the clustered database, wherein the application server operates to configure and manage connection to the clustered database, adaptively according to the state change of the clustered database at run time.

20 Claims, 11 Drawing Sheets

(51) Int. Cl.
*H04L 12/24* (2006.01)
*H04L 29/08* (2006.01)

(56) References Cited

U.S. PATENT DOCUMENTS

| | | |
|---|---|---|
| 6,938,085 B1 | 8/2005 | Belkin et al. |
| 7,376,953 B2 | 5/2008 | Togasaki |
| 7,394,288 B1 | 7/2008 | Agarwal |
| 7,483,374 B2 | 1/2009 | Nilakantan et al. |
| 7,554,993 B2 | 6/2009 | Modi et al. |
| 7,991,904 B2 | 8/2011 | Melnyk et al. |
| 8,130,776 B1 | 3/2012 | Sundararajan et al. |
| 8,131,860 B1 | 3/2012 | Wong et al. |
| 8,260,757 B1 | 9/2012 | Chatterjee et al. |
| 2002/0174136 A1* | 11/2002 | Cameron et al. .............. 707/200 |
| 2003/0014480 A1 | 1/2003 | Pullara et al. |
| 2003/0078958 A1 | 4/2003 | Pace et al. |
| 2003/0120822 A1 | 6/2003 | Langrind et al. |
| 2004/0177126 A1 | 9/2004 | Maine |
| 2004/0205771 A1 | 10/2004 | Sudarshan et al. |
| 2005/0021354 A1 | 1/2005 | Brendle et al. |
| 2005/0027901 A1 | 2/2005 | Simon et al. |
| 2005/0038801 A1* | 2/2005 | Colrain et al. ................ 707/100 |
| 2005/0094577 A1* | 5/2005 | Ashwood-Smith ........... 370/257 |
| 2005/0102412 A1 | 5/2005 | Hirsimaki |
| 2005/0223109 A1 | 10/2005 | Mamou et al. |
| 2005/0262183 A1 | 11/2005 | Colrain et al. |
| 2005/0262215 A1 | 11/2005 | Kirov et al. |
| 2006/0015600 A1 | 1/2006 | Piper |
| 2006/0031846 A1 | 2/2006 | Jacobs et al. |
| 2006/0129676 A1 | 6/2006 | Modi et al. |
| 2006/0143525 A1 | 6/2006 | Kilian |
| 2006/0176884 A1 | 8/2006 | Fair et al. |
| 2006/0209899 A1 | 9/2006 | Cucchi et al. |
| 2006/0248200 A1 | 11/2006 | Stanev |
| 2006/0294417 A1* | 12/2006 | Awasthi et al. .................. 714/10 |
| 2007/0198684 A1 | 8/2007 | Mizushima |
| 2007/0203944 A1 | 8/2007 | Batra et al. |
| 2008/0044141 A1 | 2/2008 | Willis et al. |
| 2008/0098458 A2 | 4/2008 | Smith et al. |
| 2008/0140844 A1 | 6/2008 | Halpern |
| 2008/0163124 A1 | 7/2008 | Bonev et al. |
| 2008/0195664 A1 | 8/2008 | Maharajh et al. |
| 2008/0286741 A1 | 11/2008 | Call |
| 2009/0019158 A1 | 1/2009 | Langen et al. |
| 2009/0024764 A1 | 1/2009 | Atherton et al. |
| 2009/0034537 A1* | 2/2009 | Colrain et al. ................ 370/400 |
| 2009/0037367 A1 | 2/2009 | Wein |
| 2009/0150647 A1 | 6/2009 | Mejdrich et al. |
| 2009/0172636 A1 | 7/2009 | Griffith et al. |
| 2009/0182642 A1 | 7/2009 | Sundaresan |
| 2009/0327471 A1 | 12/2009 | Astete et al. |
| 2010/0198920 A1* | 8/2010 | Wong et al. ................... 709/206 |
| 2010/0199259 A1 | 8/2010 | Quinn et al. |
| 2011/0029812 A1 | 2/2011 | Lu et al. |
| 2011/0055510 A1 | 3/2011 | Fritz et al. |
| 2011/0066737 A1 | 3/2011 | Mallart |
| 2011/0071981 A1* | 3/2011 | Ghosh et al. .................. 707/634 |
| 2011/0119673 A1 | 5/2011 | Bloch et al. |
| 2011/0161457 A1 | 6/2011 | Sentinelli et al. |
| 2011/0228668 A1* | 9/2011 | Pillai et al. .................... 370/217 |
| 2011/0246582 A1 | 10/2011 | Dozsa et al. |
| 2012/0023557 A1 | 1/2012 | Bevan et al. |
| 2012/0218891 A1 | 8/2012 | Sundararajan et al. |
| 2013/0004002 A1 | 1/2013 | Duchscher et al. |

OTHER PUBLICATIONS

International Search Report and Written Opinion dated Dec. 6, 2011, International Application No. PCT/US2011/051697, 11 pgs.

International Search Report and Written Opinion dated Dec. 6, 2011, International Application No. PCT/US2011/051459, 9 pgs.

European Patent Office, International Searching Authority, International Search Report and Written Opinion dated Mar. 5, 2014 for International Application No. PCT/US2012/044429, 18 pages.

Oracle International Corporation, Oracle Fusion Middleware—Configuring and Managing JDBC Data Sources for Oracle WebLogic Server 11g Release 1 (10.3.5), Apr. 2011, pp. 1-148.

Oracle International Corporation, Oracle Universal Connection Pool for JDBC—Developer's Guide 11g Release 2 (11.2), Sep. 2009, pp. 1-74.

Oracle International Corporation, Automatic Workload Management with Oracle Real Application Clusters 11g Release 2, Jan. 2010, pp. 1-31.

Oracle International Corporation, Application Failover with Oracle Database 11g, Sep. 2010, pp. 1-5.

Pfister, An Introduction to the InfiniBand Architecture, High Performance Mass Storage and Parellel I/O, 2002, pp. 617-632.

* cited by examiner

Create a New JDBC Data Source

[Back] [Next] | [Finish] | [Cancel]

RAC Connection Properties
Define RAC Connection Properties.

What is the service name of the database you would like to connect to?

Service Name: [lnrac]

Enter host and port of each listener separated by colon (eg: host1: port1) and click the add button.

Host and port tuple: [leftp: 1521] [Add]

[rightp: 1521
centerp: 1521] [Remove]

What database account user name do you want to use to create database connections?

Database User Name: [scott]

What database account password to use to create database connections?

Password: [******]

Confirm Password: [******]

[Back] [Next] | [Finish] | [Cancel]

SYSTEM AND METHOD FOR USING A GRIDLINK DATA SOURCE TO CONNECT AN APPLICATION SERVER WITH A CLUSTERED DATABASE

CLAIM OF PRIORITY

This application claims the benefit of priority on U.S. Provisional Patent Application No. 61/383,285, entitled "MIDDLEWARE MACHINE PLATFORM", filed Sep. 15, 2010; and U.S. Provisional Patent Application No. 61/384,227, entitled "MIDDLEWARE MACHINE PLATFORM", filed Sep. 17, 2010, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to a system for managing connections to a clustered database.

BACKGROUND

In the context of an application server, such as the Oracle Weblogic Server, users can configure database connectivity in the application server by configuring data sources. An application on the application server can look up a particular data source using a directory service, such as the standard Java Naming and Directory Interface (JNDI), and then request a database connection. When finished with the connection, the application can disconnect the database connection through the application server. Both application server administrators and software developers/programmers can create data sources. These are the generally areas that embodiments of the invention are intended to address.

SUMMARY

In accordance with an embodiment, a system and method is provided to support using a data source to connect an application server with a clustered database. The clustered database includes a plurality of database instances and is associated with a notification service. The notification service can be used by the clustered database to broadcast notifications that describe a state change in the plurality of database instances. The data source includes a connection pool, which manages a set of connections to the plurality of database instances in the clustered database. The data source operates to register with the notification service to receive notifications regarding the change of the clustered database, wherein the application server operates to configure and manage connections to the clustered database, adaptively according to any state changes of the clustered database at run time.

BRIEF DESCRIPTION OF THE FIGURE

FIG. 10 shows an illustration of a wizard page for configuring multiple listeners associated with a Gridlink data source in accordance with an embodiment.

DETAILED DESCRIPTION

The present invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

Additionally, the description of various embodiments of the invention provided herein use Oracle Real Application Clusters (RAC) database system as an illustrative example of a clustered database environment. It will be apparent to those skilled in the art that other types of clustered database environments can be used without limitation.

A clustered database or a database cluster can comprise multiple interconnected computers or servers that appear as if they are one server to end users and applications. Unlike a single-instance database, which has a one-to-one relationship between the database and the instance, a clustered database has a one-to-many relationship between the database and instances. For example, an Oracle RAC database system enables a user to cluster Oracle databases, using Oracle Clusterware infrastructure to bind multiple servers together, so that they operate as a single system. The Oracle RAC database system can have many instances, all of which access one database. The combined processing power of the multiple servers can provide greater throughput and scalability than what is available from a single server.

Figure 1:
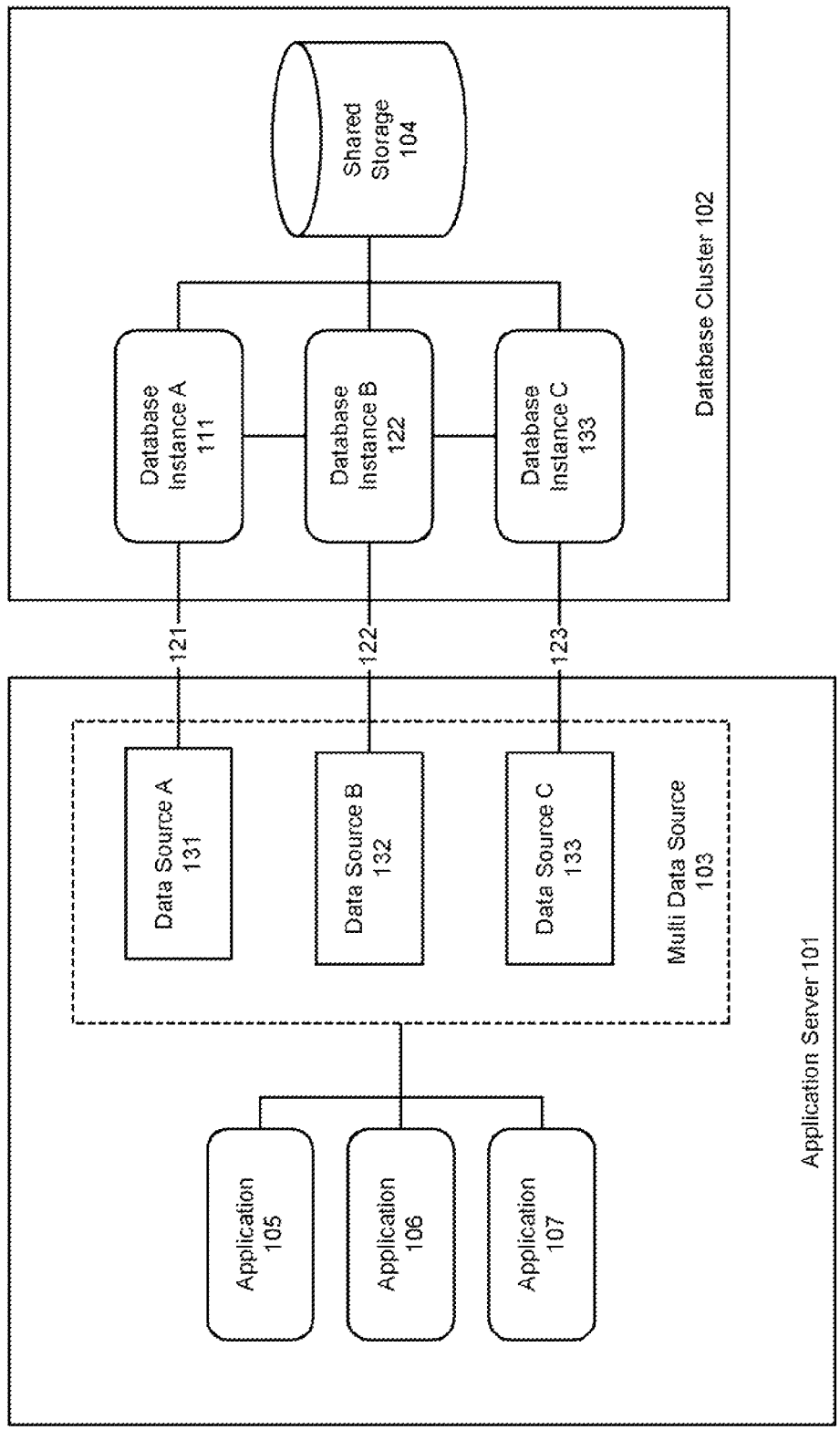
FIG. 1 shows an illustration of a multi data source system for connecting an application server to a clustered database in accordance with an embodiment.

FIG. 1 shows an illustration of a multi data source system for connecting an application server with a clustered database in accordance with an embodiment. As shown in FIG. 1, a multi data source 103 is a data source abstraction over one or more individual data sources 131, 132, and 133. The multi data source serves Java DataBase Connectivity (JDBC) connections 121, 122, and 123 from each of the member data sources according to a specified policy, such as load balancing policy and failover policy. Also, the multi data source configuration requires that each member data source obtain connections to a particular database instance.

Gridlink Data Source

In accordance with an embodiment, a system and method is provided to support using a data source, referenced to herein as a "Gridlink data source", to connect an application server with a clustered database. The clustered database includes a plurality of database instances and is associated with a notification service. The notification service can be used by the clustered database to broadcast notifications that describe a state change in the plurality of database instances. The data source includes a connection pool, which manages a set of connections to the plurality of database instances in the clustered database. The data source operates to register with the notification service to receive notifications regarding the change of the clustered database, wherein the application server operates to configure and manage connections to the clustered database, adaptively according to any state changes of the clustered database at run time.

In accordance with an embodiment, the gridlink data source can use a single data source configuration that represents a service targeted to a database cluster. The gridlink data source can respond to notification events to provide fast connection failover, runtime connection load balancing and database instance graceful shutdown. Additionally, distributed transaction (XA) affinity can be supported at the global transaction Id level.

For example, the Oracle RAC database system can support client notification to disseminate information about the state of the database cluster. A JDBC data source configuration allows for the specification of service URLs to provide RAC connectivity. The JDBC data source configuration also includes monitoring support that provides statistics and manageability of JDBC connections to the RAC cluster.

In accordance with an embodiment, the Gridlink data source addresses the shortcomings of the multi data source solution, by leveraging the capabilities of database cluster notifications to provide better overall connectivity in the form of simpler configuration, faster response to a database node failure, better utilization of database cluster resources, and improved runtime monitoring and management. In addition, mixed configurations of the Gridlink data sources and multi data sources can be supported.

Figure 2:
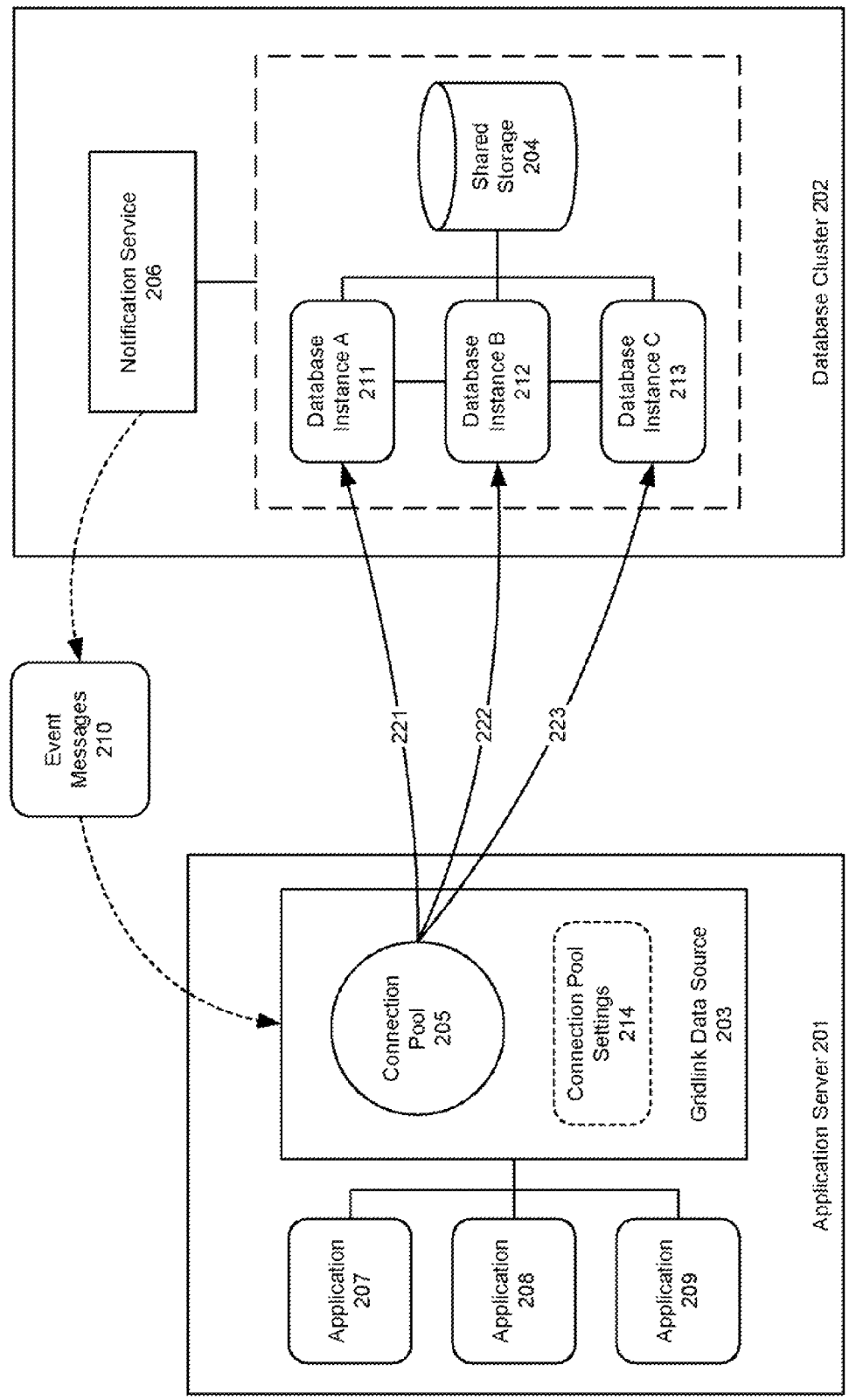
FIG. 2 shows an illustration of a Gridlink data source system for connecting an application server to a clustered database in accordance with an embodiment.

FIG. 2 shows an illustration of a Gridlink data source system for connecting an application server with a clustered database in accordance with an embodiment. As shown in FIG. 2, a Gridlink data source 203 is a single data source associated with an application server 201. The Gridlink data source simplifies the use of a clustered database 202 with application server through the single data source approach, which reduces the configuration and management complexity required to use clustered database. The Gridlink data source includes a connection pool 205, which in turn contains a set of heterogeneous connections 221, 222, and 223 to different database instances 211, 212, and 213 in the database cluster. Also as shown in FIG. 2, the different database instances connect to a shared storage 204.

In accordance with an embodiment, the management of the connections in the connection pool is based on static settings 214 configured on the connection pool, such as min/max capacity, timeouts, etc., and real time information about the connection pool in event messages 210 received from the notification service 206 that advises the data source of any state changes within the database cluster. When an application 207, 208, or 209 requests a connection from the data source, a suitable connection is selected from the connection pool and supplied to the application based on the load balancing information the connection pool has received and the current distributions of connections in use from the pool.

The application server can register with the notification service to receive notifications, such as database event messages, and therefore quickly become aware of any state changes in a clustered database. Using these state change notification events, the application server can intelligently adapt its connection pools so that the system can provide continuous, reliable and efficient access to the clustered database.

In accordance with an embodiment, connection polling can be applied as an alternative to the notification service, when the notification service is not configured or it is not operating correctly. When connection polling is used, the system can determine the viability of individual JDBC connections and detect changes in the clustered cluster topology, by performing SQL operations on individual connections.

Comparing with the notification service approach, the connection polling approach comes at the expense of additional runtime overhead, and potentially delayed detection of database instance node failures. Also, the connection polling approach potentially suffers false positives that can result in the unnecessary disablement of the data source pool and termination of valid connections that may be in use by applications.

Figure 3:
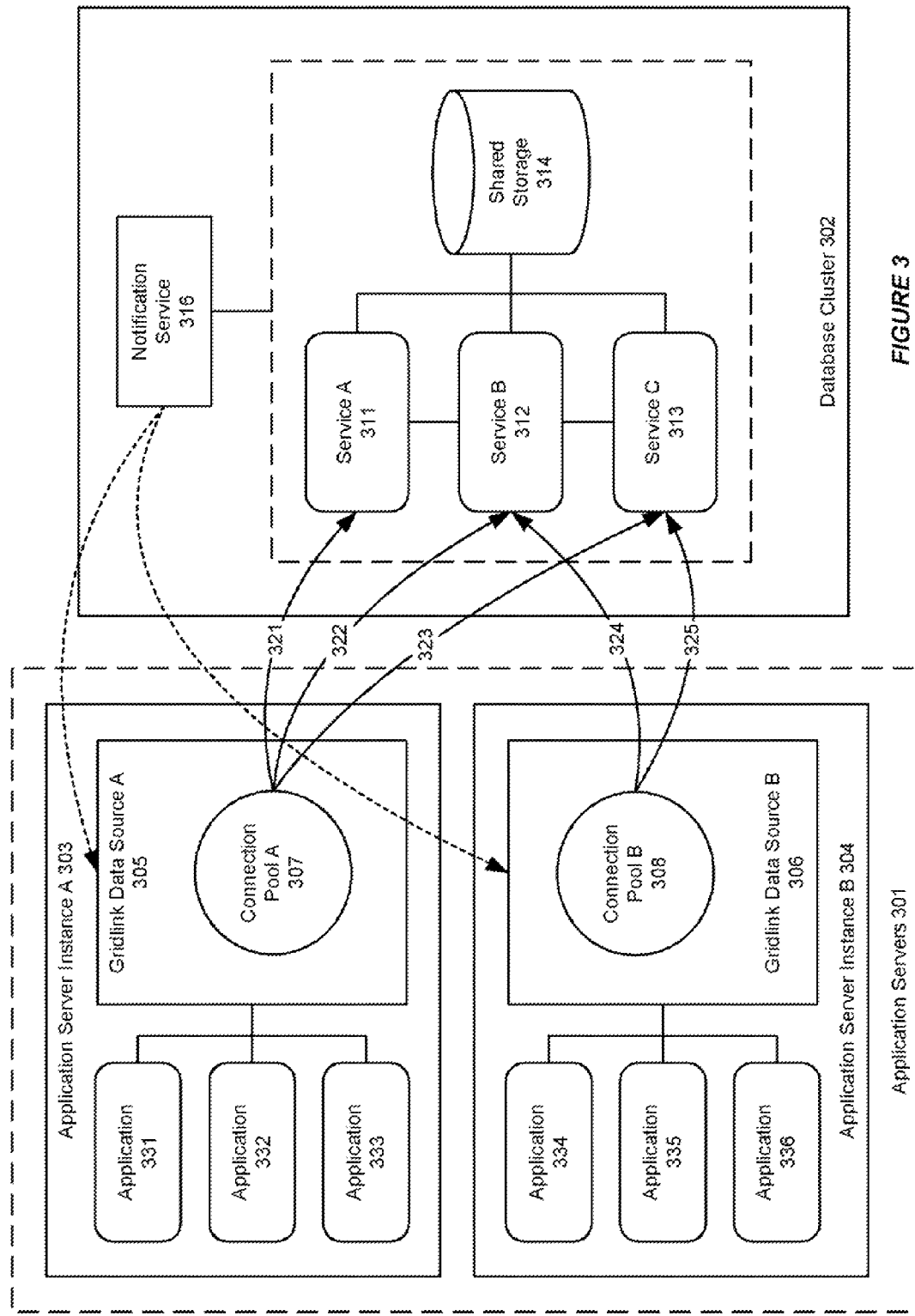
FIG. 3 shows an illustration of a Gridlink data source system for connecting application servers to different services provided by a clustered database in accordance with an embodiment.

FIG. 3 shows an illustration of a Gridlink data source system for connecting application servers to different services provided by a clustered database in accordance with an embodiment. As shown in FIG. 3, a clustered database 302 can provide different services 311, 312, and 313, each of which can be a database workload abstraction that is assignable across different database instances to provide a specific quality of service.

Also as shown in FIG. 3, an application server environment 301 can includes multiple application server instances 303 and 304. Each application server instance can include a single data source 305 and 306 with a single connection pool 307 and 308. The Gridlink data source system provides connections 321, 322, 323, 324 and 325 to the clustered database and supports the consumption of database services in an unrestricted manner in order to provide deeper integration with the clustered database.

For example, Oracle Database services can be logical abstractions for managing workloads in Oracle Database. The database services can provide a single system image for workloads, prioritization for workloads, performance measures for real transactions, and alerts and actions when performance goals are violated. The database services can enable database administrators to configure a workload, administer workloads, enable/disable workloads, and measure workloads as a single entity. The database services can further divide workloads into logically disjoint groupings. Each service represents a workload with common attributes, service-level thresholds, and priorities.

Figure 4:
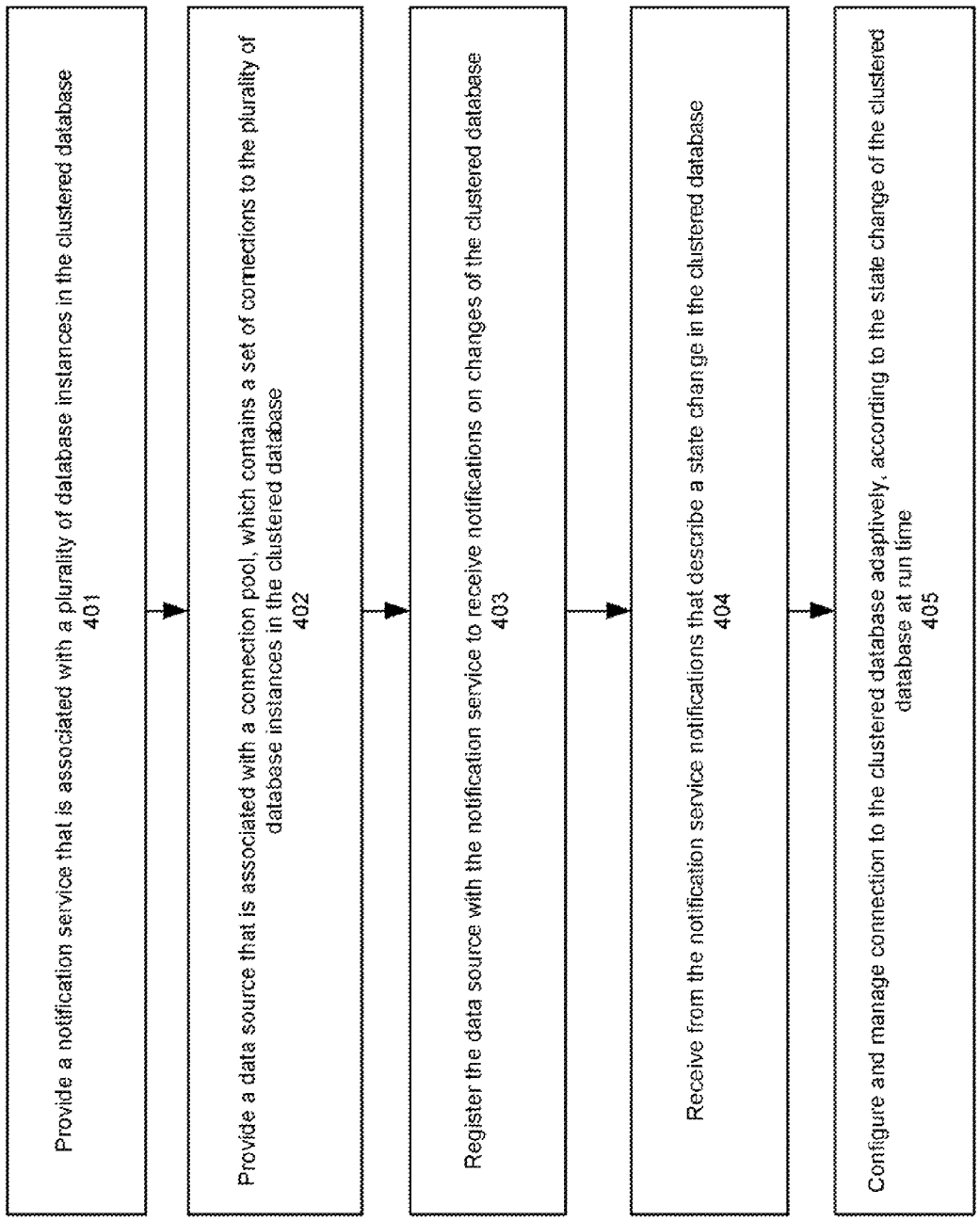
FIG. 4 illustrates an exemplary flow chart for using a Gridlink data source for connecting an application server to a clustered database in accordance with an embodiment.

FIG. 4 illustrates an exemplary flow chart for using a Gridlink data source for connecting an application server to a clustered database in accordance with an embodiment. As shown in FIG. 4, at step 401, a notification service can be associated with a plurality of database instances in the clustered database. Also, at step 402, a data source can be associated with a connection pool that contains a set of connections to the plurality of database instances in the clustered database. At step 403, the data source can register with the notification service to receive notifications on changes of the clustered database. At step 404, the data source receives from the notification service notifications that describe a state change in the clustered database at run time. Then, at step 405, the data source configures and manages connection to the clustered database adaptively, according to the state change of the clustered database.

In accordance with an embodiment, the configuration of a Gridlink data source can leverage JDBC descriptor beans that are persisted. The JDBC descriptor beans can identify a Gridlink data source and specify database notification service client configuration information. The JDBC descriptor beans can use an XML file to enable Gridlink data source functionalities. The following is an exemplary XML file for configuring a Gridlink data source that is connected to an Oracle RAC database system.

on the data source, enabling the application server to dispatch database connections based on the load balancing advisory messages received from the database. So that, the database connections are directed to a specific database node to satisfy a performance goal set by the database administrator.

The use of the runtime load balancing advisory service 506 in conjunction with the single data source 503 can simplify initial configuration and ongoing maintenance of the data source. Using the Gridlink data source system, database topology information is not needed for the application server to support load balancing, since the database directs the load balancing activities. The Gridlink data source system helps the initial construction of a data source by reducing the amount of information required to correctly configure the

```
<?xml version='1.0' encoding='UTF-8'?>
<jdbc-data-source xmlns="http://xmlns.oracle.com/weblogic/jdbc-data-source"
xmlns:sec="http://xmlns.oracle.com/weblogic/security"
xmlns:wls="http://xmlns.oracle.com/weblogic/security/wls"
xmlns:xsi="http://www.w3.org/2001/XMLSchema-instance"
xsi:schemaLocation="http://xmlns.oracle.com/weblogic/jdbc-data-source
http://xmlns.oracle.com/weblogic/jdbc-data-source/1.0/jdbc-data-source.xsd">
<name>RAC-DS</name>
<jdbc-driver-params>
    <url>
jdbc:oracle:thin:@(DESCRIPTION=(ADDRESS_LIST=(ADDRESS=(PROTOCOL=TCP)(HOST=host1-
vip)(PORT=1521))(ADDRESS=(PROTOCOL=TCP)(HOST=host2-
vip)(PORT=1521)))(CONNECT_DATA=(SERVICE_NAME=SERVICE)))
</url>
    <driver-name>oracle.jdbc.xa.client.OracleXADataSource</driver-name>
        <properties>
            <property>
                <name>user</name>
                <value>scott</value>
            </property>
        </properties>
        <password-encrypted ...</password-encrypted>
</jdbc-driver-params>
<jdbc-connection-pool-params>
    <test-table-name>SQL SELECT 1 FROM DUAL</test-table-name>
</jdbc-connection-pool-params>
<jdbc-data-source-params>
    <jndi-name>jdbc/rac-ds</jndi-name>
    <global-transactions-protocol>TwoPhaseCommit</global-transactions-protocol>
</jdbc-data-source-params>
<jdbc-oracle-params>
    <fan-enabled>true</fan-enabled>
    <ons-node-list>host1-vip:port1,host2-vip:port2
    </ons-node-list>
    <ons-wallet-file>/oracle11/onswalletfile</ons-wallet-file>
    <ons-wallet-password-encrypted>
        ...
    </ons-wallet-password-encrypted>
</jdbc-oracle-params>
</jdbc-data-source>
```

Load Balancing Advisory Event

In accordance with an embodiment, the clustered database can provide a runtime load balancing service to distribute connections across the database instance based on performance goals set by a database administrator (DBA), in order to provide better throughput and more efficient use of resources. The load balancing advisory service issues events that advise clients on the current state of the cluster including advice on where to direct connections.

Figure 5:
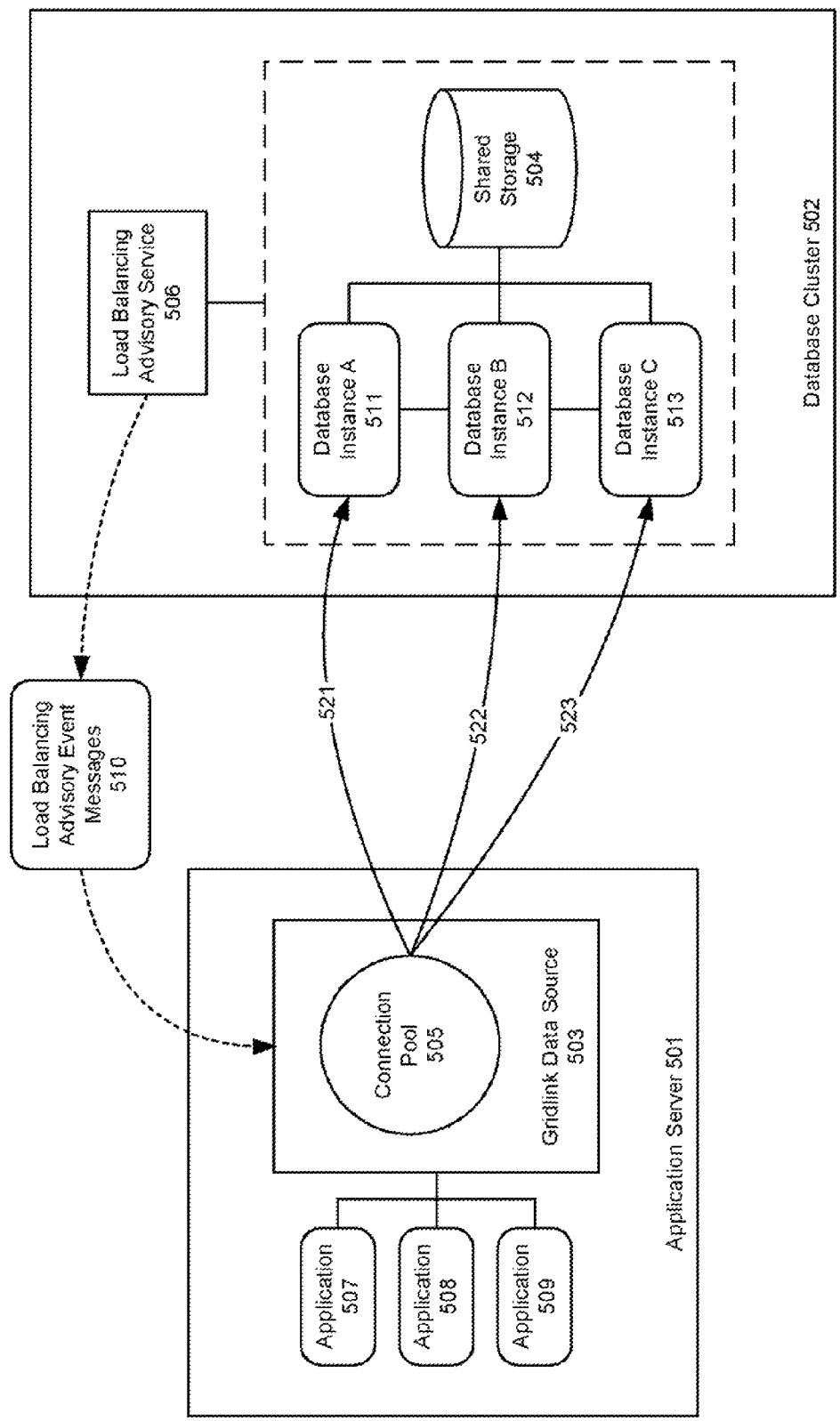
FIG. 5 shows an illustration of a Gridlink data source system that supports database load balancing advisory events in accordance with an embodiment.

FIG. 5 shows an illustration of a Gridlink data source system that supports database load balancing advisory events in accordance with an embodiment. As shown in FIG. 5, an application server 501 can receive load balancing advisory event messages 510 issued by a clustered database 502 and adjust database connections 521, 522, and 523 to the database nodes or instances 511, 512, and 513 accordingly. The system can perform load balancing configuration option at runtime middle tier. Additionally, as the database tier may change over time and services may be relocated onto new or different database instances, the Gridlink data source system requires no configuration change to reflect the changed database topology.

For example, as shown in FIG. 5, when a load balancing advisory event message received at the application server indicates that database instance A is busy while database instance C is idle, the Gridlink data source system can readjust the connections in the connection pool by assigning new connections to database instance C to achieve a load balancing target set by the DBA for better distribution of load with higher throughput.

In accordance with an embodiment, in addition to readjusting connections in the connection pool based on the load-balancing information, existing connections can be given out to application components according to the load-balancing percentages/weights when there are idle connections available.

Database State Change Event

Figure 6:
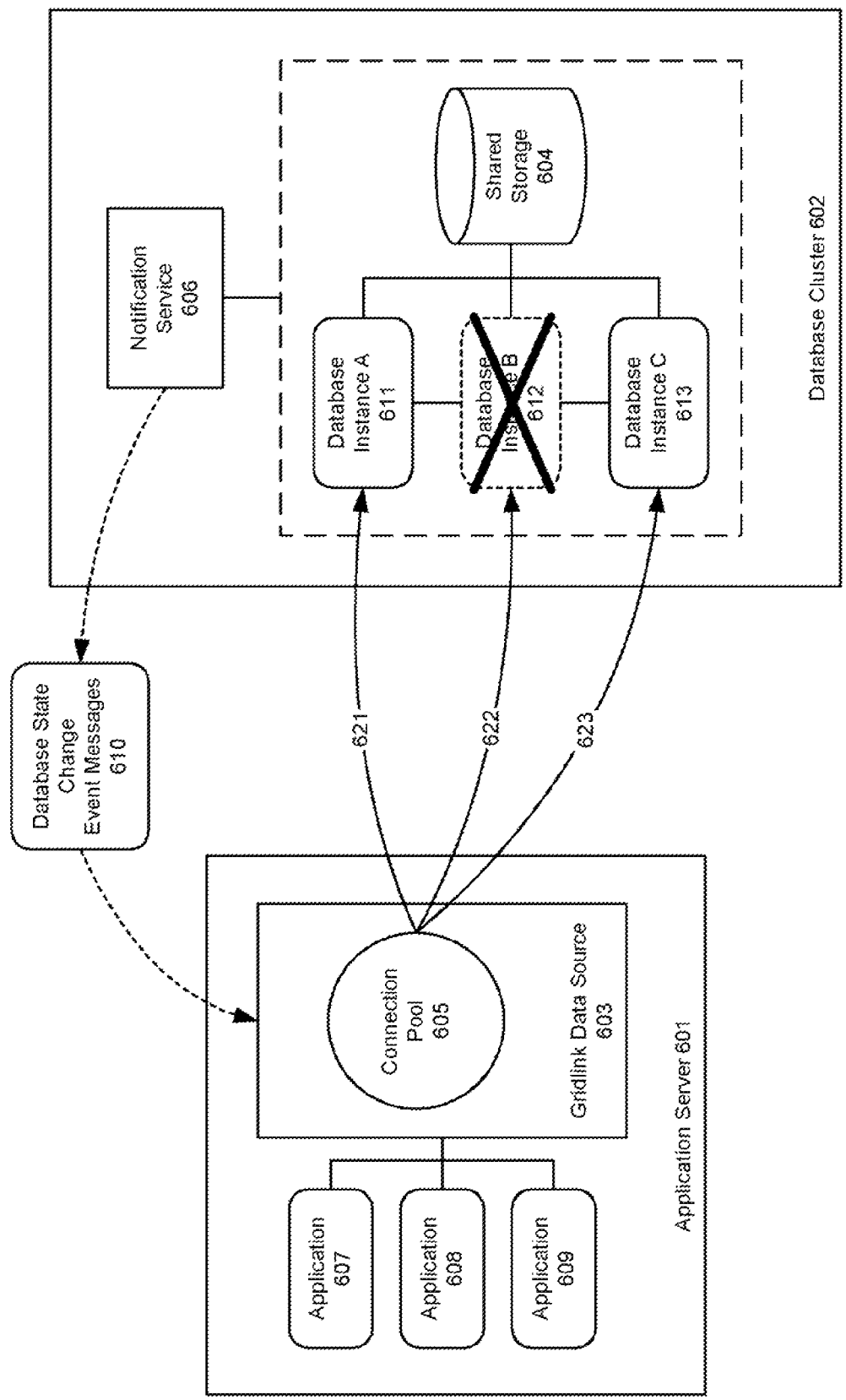
FIG. 6 shows an illustration of a Gridlink data source system that supports database state change event in the clustered database in accordance with an embodiment.

FIG. 6 shows an illustration of a Gridlink data source system that supports database state change events in accordance with an embodiment. As shown in FIG. 6, an application server 601 can receive database state change event messages 610 issued by a notification service 606 from the clustered database 602. The database state change events can include an unexpected outage of a database instance, or an addition of a new database instance.

In accordance with an embodiment, the Gridlink data source system allows the application server to adaptively respond to state changes in the database cluster, such as handling outages by immediately retracting, closing and discarding connections to database instances that have been stopped or taken out by an unplanned outage. As shown in FIG. 6, a database state change event message received at the application server can indicate an outage of database instance B 612. Correspondingly, the Gridlink data source 603 can direct the connection pool 605 to disconnect the database connection 622, so that an application 607, 608, or 609 associated with the Gridlink data source can reconnect to the database through another database instance, such as database instance A 611 or database instance C 613, to avoid an interruption in database services.

As shown in the above example, using database state change events, the Gridlink data source system does not need to periodically poll the connections to ensure they are valid, or affecting uninvolved connections to surviving nodes. This can lessen the reliance on testing of connections to ensure that applications are not given invalid connections and the application server are given the information to quickly free applications from connections that become invalid because of database node failures without unnecessary delays.

In addition to handling unexpected database outage, the Gridlink data source allows an application server to proactively reapportion its set of connections to support scenarios where new database instances are added or are restarted after an outage. This allows the application server to make full use of the resources within the clustered database. Furthermore, using the database service model, the system allows database administrators to make changes to the database service/instance allocations, which are then seamlessly applied through the affected application server connection pools without a need to make configuration changes to the connection pool configuration. It also removes the need to create complex arrangements of multiple data sources to represent a dedicated instance of the clustered database.

Furthermore, using the database state change events, the Gridlink data source can provide fast connection failover capabilities and responds to clustered database service and node events, such as {UP, DOWN} events, to ensure that the reserve of physical connections in the pool are always pointing to a valid database node. Furthermore, the Gridlink data source ensures that the reserve of physical connections is well distributed across the available database nodes. The Fast Connection Failover behavior can be enabled as a configuration setting on the data source. Metrics can be made available to allow administrators to monitor and review what action an application server has taken on its data sources upon receipt of database notification events.

Distributed Transaction (XA) Affinity

In accordance with an embodiment, distributed transaction (XA) affinity is used to ensure that all database operations performed on a database cluster within the context of a global transaction are directed to the same database instance. Affinity can be established based on the global transaction id, instead of by individual data source, to ensure that connections obtained from different data sources that are configured for the same database cluster are all associated with the same database instance. The two-phase commit optimization can be supported by the Gridlink data source and can also participate in XA affinity.

Figure 7:
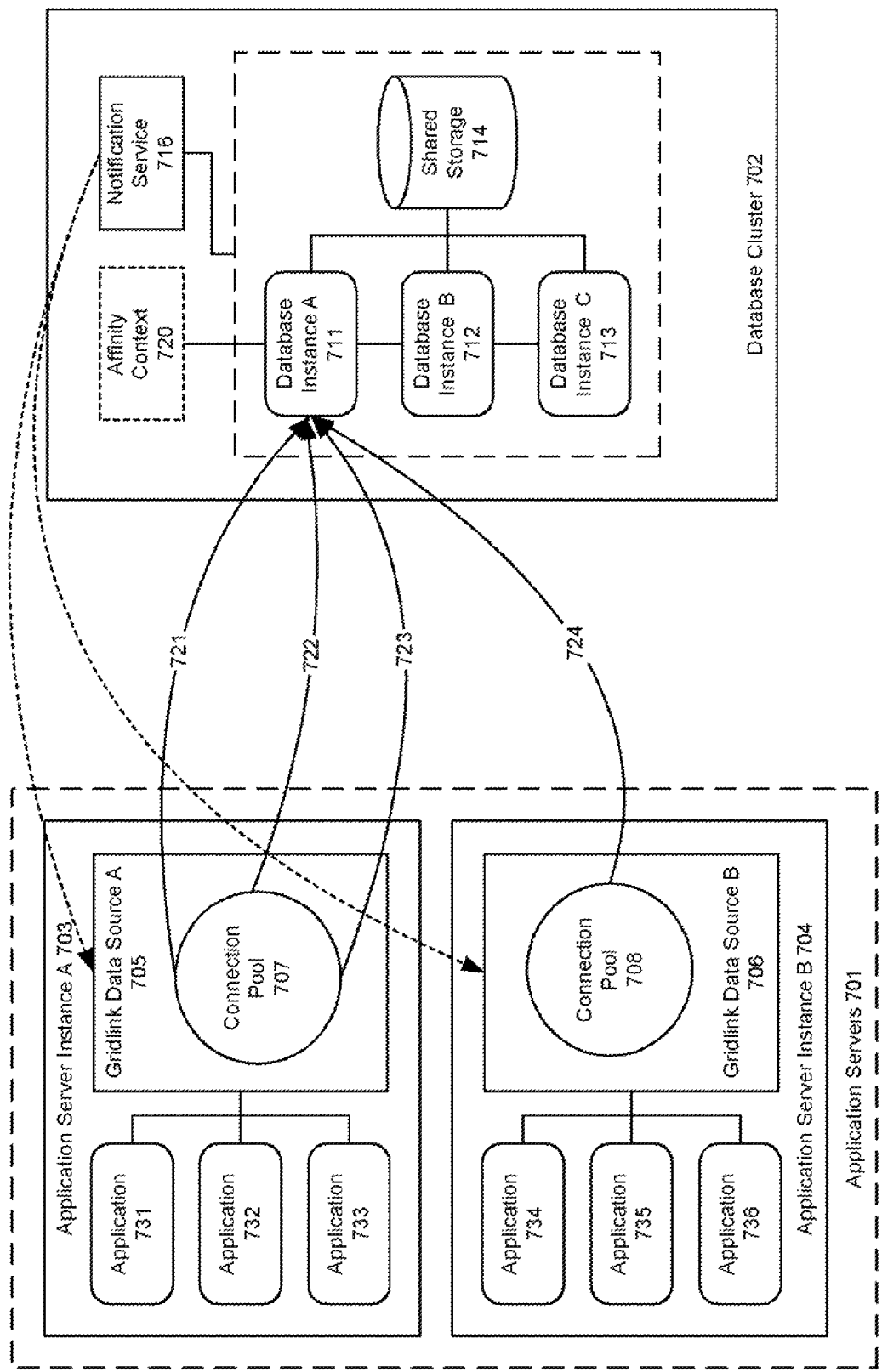
FIG. 7 shows an illustration of a Gridlink data source system that supports distributed transaction (XA) in accordance with an embodiment.

FIG. 7 shows an illustration of a Gridlink data source system that supports distributed transaction (XA) in accordance with an embodiment. As shown in FIG. 7, the application server environment 701 using Gridlink data sources can support global transactions by ensuring all the data base operations for a global transaction performed on a clustered database 702 are directed to the same database instance 711. In one embodiment, a first connection request 721 for an XA transaction is load balanced and is assigned with an affinity context 720. All subsequent connection requests 722, 723, and 724 are routed to the same database instance using the affinity context of the first connection.

Database Graceful Planned Shutdown

Figure 8:
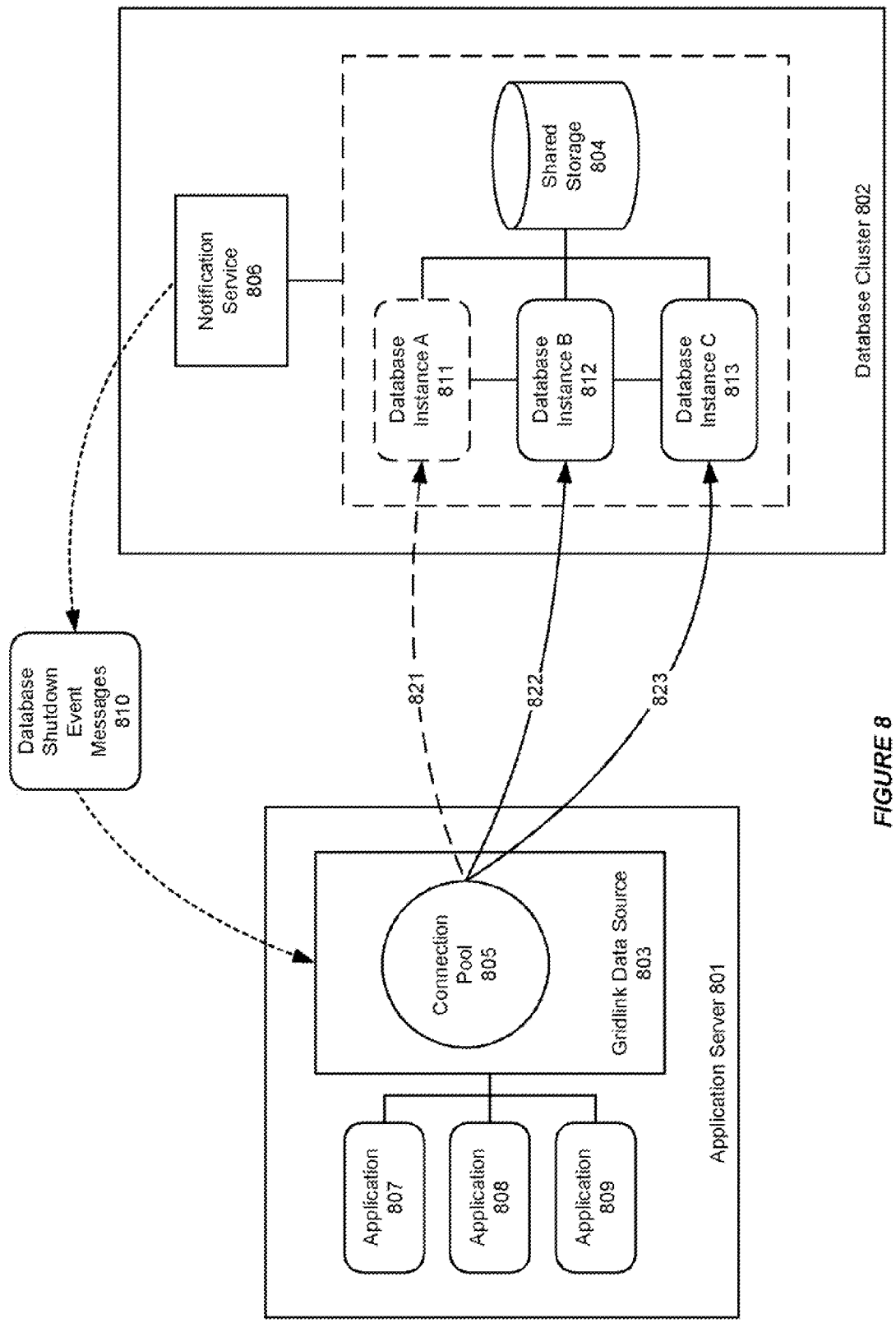
FIG. 8 shows an illustration of a Gridlink data source system that supports database graceful shutdown in accordance with an embodiment.

In accordance with an embodiment, a graceful planned shutdown occurs when a database node/service is targeted for a shutdown operation, with the corresponding issuance of a database event indicating the shutdown has been requested. FIG. 8 shows an illustration of a Gridlink data source system that supports database graceful shutdown in accordance with an embodiment. As shown in FIG. 8, an application server 801 can receive database shutdown event messages 810 issued by a notification service 806 from the clustered database 802. And, the database shutdown event messages indicate that the database instance A 811 is planned to be shutdown.

In order to support graceful planned shutdown of the database, the application server may not immediately abort connections 821 that are in use when it detects that the database shutdown target is no longer accepting new connections. Instead, the Gridlink data source 803 allows any in progress transactions to complete before closing and recreating the physical connections, while cleaning up idle connections so that new requests for connections are not sent the database target in active shutdown mode.

The data source can detect the active connections that are connected to the database shutdown target, and mark them so that they are closed and recreated when the associated transaction is complete and the connection is returned to the connection pool 805. An exception may not be created immediately on the receipt of the shutdown event or detection of disallowed connection request, in order to allow any in progress transactions to complete. Additionally, any idle connections in the pool that are connected to the database shutdown target can be preemptively closed. The system also allows the data source to route new requests around the database shutdown target, while allowing in progress transactions to complete to fulfillment, enabling the database shutdown operation to be transparent to running applications.

Universal Connection Pool (UCP) Library

In accordance with an embodiment, a database connection module, such as a Universal Connection Pool (UCP) library, can be used to connect an application server to a clustered database. The UCP library is a client-side library from the perspective of the database server that is logically an extension of the JDBC driver. The database connection module can support high availability and performance capabilities for a clustered database, in addition to providing a generic JDBC connection pooling implementation.

Figure 9:
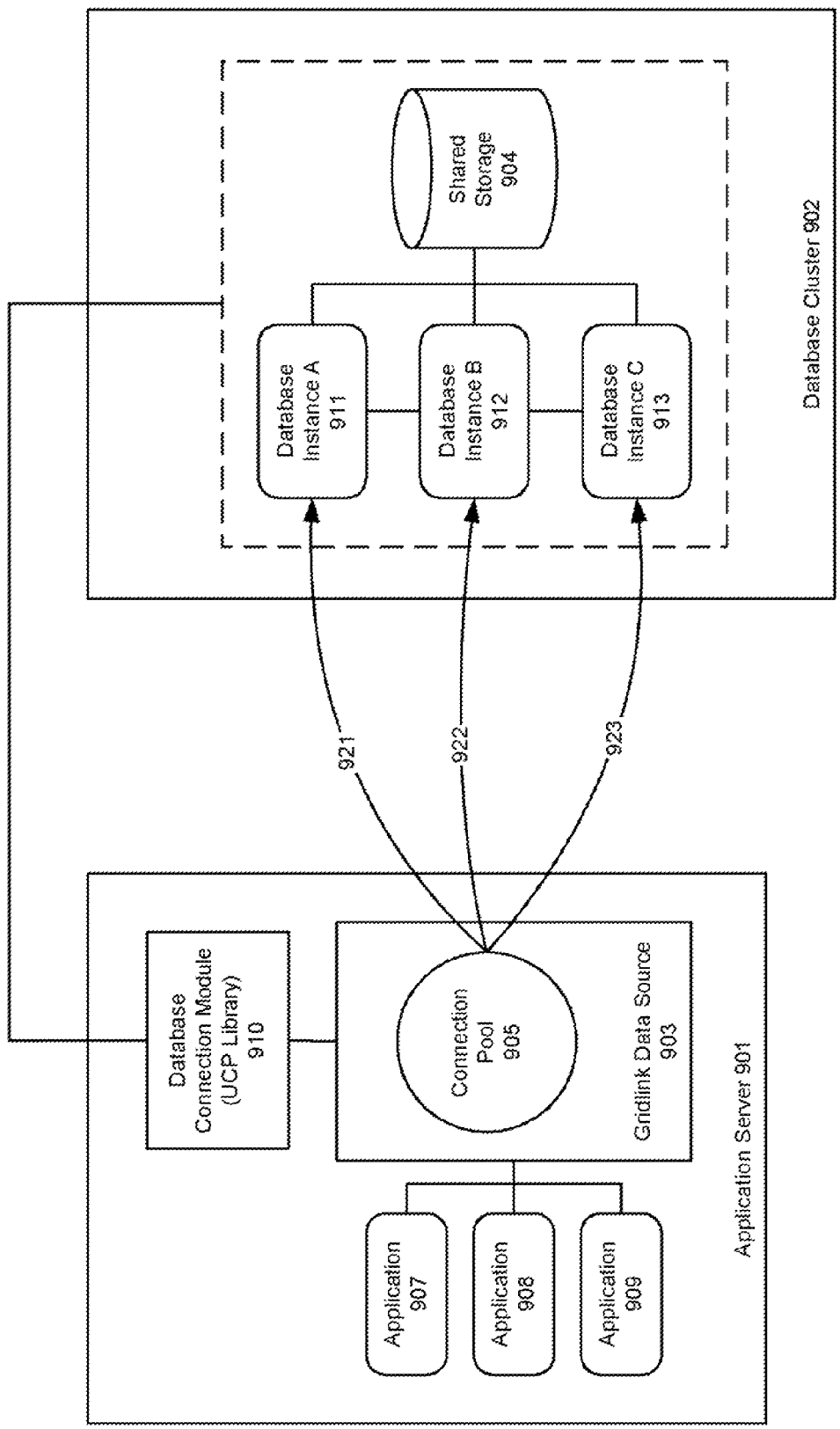
FIG. 9 shows an illustration of a Gridlink data source system using a database connection module in accordance with an embodiment.

FIG. 9 shows an illustration of a Gridlink data source system using a database connection module in accordance with an embodiment. The application server 901 can leverage the cluster database integration support of a UCP library 910 to connect with a clustered database 902 through a Gridlink data source 903.

In accordance with an embodiment, without a need to use the JDBC connection pooling feature provided by the UCP library, the Gridlink data source can connect to the database cluster and take advantage of other capabilities supported by the UCP library, such as fast connection failover, runtime connection load balancing and XA connection affinity.

In accordance with an embodiment, the connection module can utilize an application server timer and work managers for better utilization and management of resources such as Java Virtual machines (JVMs). In addition, an API can allow an application server to obtain clustered database advisories to more efficiently allocate connections across database instances and to better respond to changes in the database cluster topology. For example, the RAC capabilities of UCP can be refactored and exposed to the application server in the form of a RAC module API. This API can provide callback notifications in response to changes in the RAC cluster topology and advisories for runtime connection load balancing and connection affinity. The API also provides notification event callbacks that an application server can use for logging and other diagnostic purposes. The API can surface statistics counts and status information about RAC cluster nodes that can be used for RAC data source runtime monitoring.

In accordance with an embodiment, UCP can be designed as a standalone Java library that provides connection pooling and database integration features. As such, the UCP library can manage its own threads and timers. UCP can provide a timer and work manager SPI that allows the application server to plug in instances of application server timers and work managers for UCP's internal use when the UCP APIs are accessed within an application server process. This allows for increased control and runtime visibility of the threads and timers used by the UCP library. Additionally, the affinity capabilities provided by UCP can be leveraged to assign connections based on a global transaction Id even when different data sources are accessed on the same, and separate, application server instances.

Data Source Creation Wizard

In accordance with an embodiment, a data source creation wizard can support creating a Gridlink data source that is configured to connect with a clustered database, such as an Oracle RAC database. The creation of a Gridlink data source includes setting up database listener address information and notification service client configuration information that are needed for connecting to a database service.

For example, in order to connect with the Oracle RAC database, the data source creation wizard can provide two ways to specify the connection target. The first approach uses a connect_descriptor in JDBC URL format, which is shown as the following, for specifying different listeners for the data source.

```
jdbc:oracle:thin:@(DESCRIPTION=
  (ADDRESS_LIST=
    (ADDRESS=
      (PROTOCOL=TCP)(HOST=host1-vip)(PORT=1521)))
      (PROTOCOL=TCP)(HOST=host2-vip)(PORT=1521)))
    (CONNECT_DATA=(SERVICE_NAME=my_service)))
```

The second approach is a wizard driven approach that allows each of the listener entries to be specified individually, from which the final JDBC URL can ultimately be constructed. The wizard driven approach enables a user to specify and test multiple listeners and notification service clients for creating and updating Gridlink data sources.

FIG. 10 shows an illustration of a wizard page 1000 for configuring multiple listeners associated with a Gridlink data source in accordance with an embodiment. As shown in FIG. 10, the Gridlink data source can connect to a database service with a name of "Inrac." This Gridlink data source is associated with three listeners, that are configured to use a host and port tuple: leftp:1521, rightp:1521, or centerp:1521 respectively. Each listener can be tested separately in order to verify that the connection is valid and to report back to the user if there is any problems for a particular listener.

Figure 11:
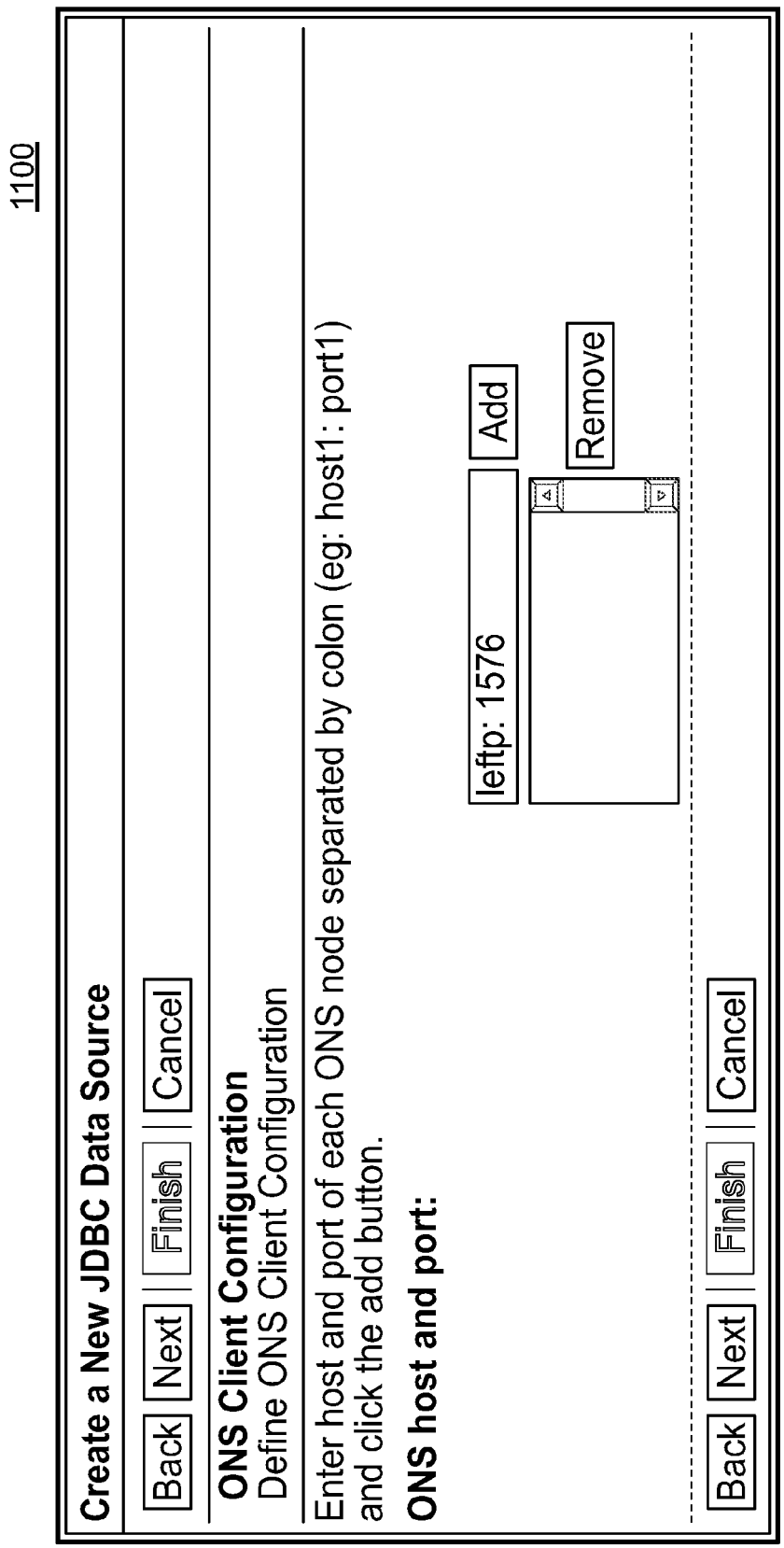
FIG. 11 shows an illustration of a wizard page for configuring a notification service client associated with a Gridlink data source in accordance with an embodiment.

FIG. 11 shows an illustration of a wizard page 1100 for configuring a notification service client associated with a Gridlink data source in accordance with an embodiment. As shown in FIG. 11, the Gridlink data source is further associated with a notification service client, which is configured to use a host and port tuple: leftp:1526. The notification service client can also be tested separately. In addition, the Gridlink data source can be associated with additional notification service clients if it is necessary.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system to support connecting an application server with a clustered database, comprising:
   an application server operating on one or more microprocessor;
   a clustered database having a heterogeneous plurality of data providers;
   a notification service operating on the clustered database;
   wherein the notification service is used by the clustered database to broadcast notifications that describe a state change in the clustered database;

a single data source operating on the application server wherein the single data source operates to connect the application server with the clustered database, and wherein the single data source comprises a connection pool which manages a heterogeneous set of connections to the heterogeneous plurality of data providers in the clustered database, wherein particular connections of said heterogeneous set of connections are configured for connecting to particular data providers of said heterogeneous plurality of data providers;

wherein the single data source registers with the notification service of the clustered database to receive said notifications that describe a state change in the clustered database;

wherein the single data source receives, from the notification service of the clustered database, notifications that describe a state change in the clustered database; and wherein, in response to receiving said notifications that describe a state change in the clustered database, the single data source configures said connection pool to manage said heterogeneous set of connections between the application server and the heterogeneous plurality of data providers in the clustered database adaptively according to the state change of the clustered database at run time.

2. The system according to claim 1, wherein:
the state change of the clustered database includes one of:
   one or more data providers have been stopped or taken out by an unplanned outage, and
   a data provider is added in or restarted after an outage.

3. The system according to claim 1, wherein:
the single data source provides database fast connection failover capabilities and responds to database service events to ensure each connection of said heterogeneous set of connections is valid.

4. The system according to claim 1, wherein:
the single data source operates to use metrics to monitor actions taken by the application server.

5. The system according to claim 1, wherein:
the single data source operates to poll the heterogeneous set of connections to the plurality of data providers in the clustered database as an alternative to the notification service.

6. The system according to claim 1, wherein:
the single data source operates to receive notifications from the notification service that contain load balancing advisory events.

7. The system according to claim 1, further comprising:
the single data source ensures that all database operation within context of a global transaction are directed to a same database instance.

8. The system according to claim 1, further comprising:
the single data source supports a planned shut down operation of a targeted database instance in the clustered database.

9. The system according to claim 8, wherein:
the single data source allows any in progress transactions to complete before closing and recreating one or more physical connections.

10. The system according to claim 8, wherein:
the single data source cleans up idle connections so that new requests for connections are not sent to the targeted database instance in the clustered database.

11. A method to support connecting an application server with a clustered database having a heterogeneous plurality of data providers, said method comprising:
providing an application server operating on one or more microprocessor;
providing a notification service operating on a clustered database; wherein the notification service is used by the clustered database to broadcast notifications that describe a state change in the clustered database;
providing single a data source on the application server wherein the single data source operates to connect the application server with the clustered database, and wherein the single data source comprises a connection pool which manages a heterogeneous set of connections to the heterogeneous plurality of data providers in the clustered database, wherein particular connections of said heterogeneous set of connections are configured for connecting to particular data providers of said heterogeneous plurality of data providers;
registering the single data source with the notification service of the clustered database to receive said notifications that describe a state change in the clustered database;
receiving with the single data source, from the notification service of the clustered database, notifications that describe a state change in the clustered database; and
wherein, in response to receiving said notifications that describe a state change in the clustered database, the single data source configures said connection pool to manage said heterogeneous set of connections between the application server and the heterogeneous plurality of data providers of the clustered database adaptively according to the state change of the clustered database at run time.

12. The method of claim 11, wherein the state change of the clustered database includes one of:
   one or more data providers have been stopped or taken out by an unplanned outage, and
   a data provider is added in or restarted after an outage.

13. The method of claim 11, wherein:
the single data source provides database fast connection failover capabilities and responds to database service events to ensure each connection of said heterogeneous set of connections is valid.

14. The method of claim 11, wherein:
the single data source operates to receive notifications from the notification service that contain load balancing advisory events.

15. The method of claim 11, wherein:
the single data source ensures that all database operations within context of a global transaction are directed to a same database instance.

16. The method of claim 11, wherein:
the single data source supports a planned shut down operation of a targeted database instance in the clustered database.

17. The method of claim 11, wherein:
the single data source supports a planned shut down operation of a targeted database instance in the clustered database by allowing any in progress transactions to complete before closing and recreating one or more physical connections.

18. The method of claim 11, wherein:
the single data source supports a planned shut down operation of a targeted database instance in the clustered database; and the single data source cleans up idle connections so that new requests for connections are not sent to the targeted database instance in the clustered database.

19. A non-transitory computer readable storage medium including instructions stored thereon for supporting connecting an application server with a clustered database having a heterogeneous plurality of data providers, wherein said instructions, when executed cause a computer system to perform steps comprising:

providing an application server operating on one or more microprocessor;

providing a notification service operating on a clustered database; wherein the notification service is used by the clustered database to broadcast notifications that describe a state change in the clustered database;

providing a single data source on the application server wherein the single data source operates to connect the application server with the clustered database, and wherein the single data source comprises a connection pool which manages a heterogeneous set of connections to the heterogeneous plurality of data providers in the clustered database, wherein particular connections of said heterogeneous set of connections are configured for connecting to particular data providers of said heterogeneous plurality of data providers;

registering the single data source with the notification service of the clustered database to receive said notifications that describe a state change in the clustered database;

receiving with the single data source, from the notification service of the clustered database, notifications that describe a state change in the clustered database; and wherein, in response to receiving said notifications that describe a state change in the clustered database, the single data source configures said single data source to manage said heterogeneous set of connections between the application server and the heterogeneous plurality of data providers of the clustered database adaptively according to the state change of the clustered database at run time.

20. A non-transitory computer readable storage medium of claim 19, wherein:

the single data source provides database fast connection failover capabilities and responds to database service events to ensure each connection of said heterogeneous set of connections is valid.

* * * * *